United States Patent [19]

Kelleher

[11] 4,417,332

[45] Nov. 22, 1983

[54] TURNTABLE SPEED CONTROL

[75] Inventor: Kevin C. Kelleher, Plainfield, Ind.

[73] Assignee: RCA Corporation, New York, N.Y.

[21] Appl. No.: 273,728

[22] Filed: Jun. 15, 1981

[51] Int. Cl.³ ............................................. G11B 25/04
[52] U.S. Cl. ....................................................... 369/266
[58] Field of Search ................................. 369/266, 267

[56] References Cited

U.S. PATENT DOCUMENTS

| | | | |
|---|---|---|---|
| 3,831,073 | 8/1974 | Tanikoshi | 318/254 |
| 3,842,194 | 10/1974 | Clemens | 178/6.6 A |
| 3,912,283 | 10/1975 | Hammond et al. | 369/266 |
| 4,079,942 | 3/1978 | Kunen | 369/266 |
| 4,194,743 | 3/1980 | Ohsawa et al. | 369/266 |
| 4,223,255 | 9/1980 | Goldman et al. | 318/138 |
| 4,239,237 | 12/1980 | Pyles | 274/1 E |
| 4,258,299 | 3/1981 | Takeda et al. | 318/258 |

Primary Examiner—Steven L. Stephan
Attorney, Agent, or Firm—E. M. Whitacre; W. H. Meise; J. E. Roehling

[57] ABSTRACT

A turntable drive system for use with a video disc player employs a low cost magnetic sensor, such as a Hall effect device, for turntable speed control. An integral motor mounting bracket and flux concentrator is positioned with respect to a ring magnet having a plurality of permanently magnetized poles of alternate polarity along its periphery such that the magnetic field of the magnetized ring passes through an active surface of the magnetic sensor. The Hall effect device provides an output representative of the rotary motion of the ring magnet which is fixed to the turntable. The output of the Hall effect device is compared to a reference oscillator and an error signal indicative of drift in the rotary speed of turntable from the predetermined speed is fed to a DC motor for driving the turntable at the desired rotational speed.

4 Claims, 4 Drawing Figures

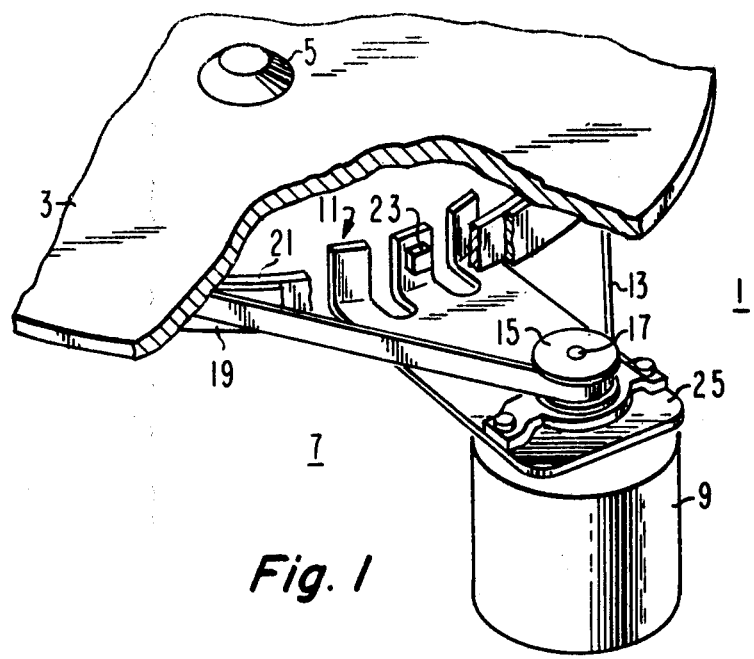
Fig. 1
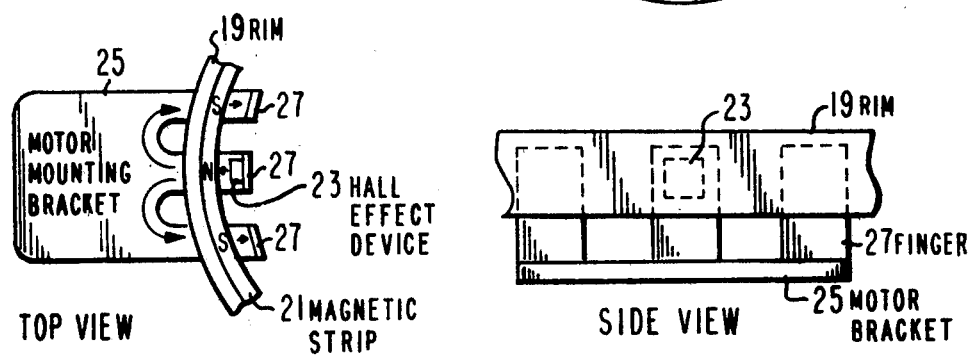
Fig. 2
Fig. 3
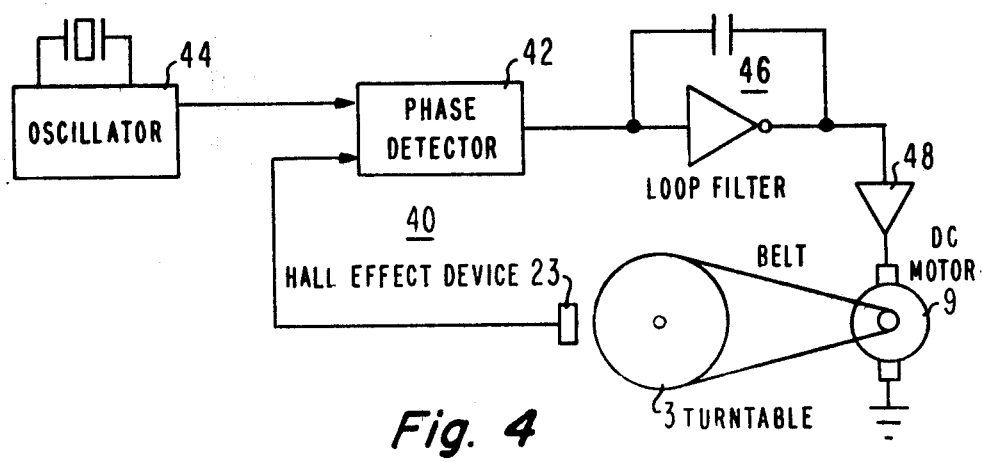
Fig. 4

TURNTABLE SPEED CONTROL

The present invention relates generally to apparatus for recording/retrieving information from a disc record and, more particularly, to turntable speed control systems for disc record playback apparatus.

Most recording and playback systems using a disc medium require precise control of the turntable rotational speed for proper operation. For example, such a requirement exists in video disc systems. In certain video disc systems, video information is recorded as a succession of geometric variations in the bottom of a spiral groove on the surface of a disc record. A pickup stylus which engages the spiral groove senses capacitance variations between a conductive electrode on the stylus and a conductive property of the disc record as the record rotates. The capacitance variations, representative of the prerecorded video information, are applied to suitable signal processing circuitry for playback on, for example, a conventional television receiver. One such variable capacitance concept, as applied to video disc systems, is described in detail in U.S. Pat. No. 3,842,194, issued on Oct. 15, 1974 to J. K. Clemens.

In video disc systems, such as the Clemens type, it has been recognized that not only does the relative motion between the record and the playback stylus have to be maintained at a predetermined speed (e.g., 7.5 Hz) but also speed variations from the predetermined speed must be maintained within specified tolerance limits (e.g., ±0.01 percent) to obtain accurate reproduction of the prerecorded signals. The predetermined speed and specified tolerance limits are also necessary to assure that the horizontal and vertical synchronizing information is stable and within the lock up range of the deflection circuits of a television receiver. Moreover, when the prerecorded information is a color television signal, with chrominance information recorded on a subcarrier signal, the recovered signal must be stable and within the lock up range of the color processing circuits of the playback system in order to minimize phase distortions.

In U.S. Pat. No. 4,239,237, issued on Dec. 16, 1980 to G. D. Pyles, a turntable speed control system is disclosed which provides highly accurate control of the turntable rotational speed. In that system, a motor driven turntable supports, for rotation therewith, a ring having a plurality of permanently magnetized pole pieces symmetrically disposed along the periphery thereof. A stator core of magnetic material includes a pair of pole pieces having spaced surfaces which form an airgap across which magnetic flux is directed when the stator winding is energized with alternating current (e.g., 60 Hz). The airgap is positioned to receive the ring so that the permanently magnetized pole pieces pass in succession through the airgap when the turntable is rotating. The rotating magnetic ring and the energized core form a synchronizer which opposes any departures of the turntable speed from a rotational frequency (e.g., 7.5 Hz) corresponding to the frequency of the winding energization current (e.g., 60 Hz) divided by the number of pairs of permanently magnetized poles (e.g., 8).

The Pyles system maintains a precise relationship between the turntable rotational frequency and the winding energization current frequency with a high degree of accuracy. If the turntable rotational speed is to be maintained at a desired value with a high degree of accuracy using a synchronous motor, however, it is important that the source of winding energization current have a high degree of frequency stability.

In some areas of the world, the frequency of the house current supplied by the power distribution system is normally sufficiently stable such that the house current may be used to energize the synchronizer winding with the assurance that a synchronous motor will maintain the turntable rotational speed within the indicated 0.01% deviation limits. In other areas of the world, however, the frequency of the power distribution system is not stable enough (e.g., ±0.25%) to use house current for speed control. In these locations where the power line lacks sufficient stability, the accuracy of the rotational speed of a turntable of a video disc system cannot be assured by a Pyles type synchronizer approach. In accordance with the principles of the present invention, a low cost turntable drive system which may be employed to obtain a high degree of turntable rotational speed stability with substantial independence of the power line frequency instabilities is provided.

Further, in accordance with the principles of the present invention, a turntable drive system is provided. The system includes a turntable for rotating a disc-shaped record, means for rotating the turntable and means for coupling the rotating means to the turntable. Further, the system comprises an annular member, a Hall effect device and means for supporting the rotating means. The annular member which is mounted on the turntable has a plurality of permanently magnetized poles of alternate polarity along its periphery. The Hall effect device senses the rotary motion of the turntable and provides an indication of its rotational speed. The rotating means is mounted onto the supporting means which also provides support for the Hall effect device and acts as a flux concentrator. The supporting means concentrates the magnetic flux from the annular member such that a component of the magnetic field from the annular member passes through the active area of the Hall effect device.

Other features and advantages of the invention will be more fully understood from the following detailed description of the preferred embodiment, the appended claims and the accompanying drawing in which:

FIG. 1 illustrates a video disc player incorporating a turntable drive system in accordance with the principles of the instant invention;

FIGS. 2 and 3 show top and side views, respectively, of a portion of FIG. 1 illustrating the integral motor mounting bracket and flux concentrator of the present invention; and FIG. 4 is a schematic diagram of the control system for the turntable drive system.

Illustrated in FIG. 1 is a video disc player 1 of the type described in the aforementiond Clemens patent. As shown therein, a turntable 3 is rotatably supported by a spindle 5 fixedly secured to a mounting plate (not shown) of the player. A single pickup (not shown) positioned above the turntable recovers recorded information from a record (not shown) disposed on the turntable. The output of the signal pickup, after appropriate processing, is applied to a television receiver.

The turntable drive system 7 of the present invention comprises a turntable motor 9 and a speed control mechanism 11. The motor is energized by a direct current power source. The motor, when energized, drives the turntable by means of a yieldable belt 13 disposed about a grooved pulley 15 mounted on rotor shaft 17 and a downwardly extending annular flange 19 coaxially secured to the underside of turntable 3. The rotational speed of the motor and the dimensions of pulley 15 and flange 19 are selected such that the turntable is nominally rotated at a desired predetermined speed (e.g., 7.5 Hz). The belt may, for example, be fabricated from an elastic, creepable material such as neoprene rubber.

The speed control mechanism 11 comprises a magnetic ring 21 affixed to the interior of the downwardly extending flange 19, as shown in FIG. 2, a Hall effect device 23 and motor mounting bracket 25. Magnetic ring 21 has an even-number plurality (e.g., 16) of permanently magnetized poles of alternate polarity symmetrically disposed along its periphery. The magnetized ring is preferably made from the Plastiform Brand Permanent Magnetic material, BX-1013, type 1.4H. The turntable 3 and flange 19, on the other hand, are preferably made from non-magnetic material such as plastic.

The turntable drive system of the present invention consists of a DC motor which is controlled by a closed servo loop. A signal which indicates the rotational speed of the turntable is compared to a reference signal which is related to the predetermined desired speed. The voltage drive to the DC motor is controlled such that the proper relationship between these signals is maintained.

The use of a magnetic sensor mounted near a rotating member to detect the rotary motion of permanent magnets or a multiple continuous strip has been used in the prior art as a means of detecting rotational speed. Relatively high costs, however, have limited the application of this technique to relatively sophisticated industrial equipment. In the past, low cost speed control devices intended for consumer markets have been equipped with optical sensors. In these consumer applications, a light source (typically a light emitting diode) and an optical detector are used to sense a continuous strip having intermittent bands of either reflective or transmissive material. The disadvantage of an optical speed control system is its vulnerability to dirt and corrosion.

In the prior art, magnetic speed controls have used either expensive magnets or an expensive sensor because low cost magnets or magnetic strips did not produce enough magnetic flux to activate low cost sensors, such as Hall effect devices.

In accordance with the present invention, the flux density from a low cost multipole ring magnet is concentrated so that an inexpensive Hall effect device may be used as the magnetic sensor of the speed control. This results in a system which is approximately one third of the cost of an equivalent optical speed sensor. Since Hall effect devices can detect only the component of the magnetic field which passes through the active area of the sensor, i.e., that field normal to the active surface the present invention includes a flux concentrator. FIGS. 2 and 3 show how the flux concentrator provides the necessary magnetic coupling to effect speed sensing.

The integral motor mounting bracket and flux concentrator 25 is formed in an "L" shape with fingers 27 positioned in close proximity to magnetic strip 21. In a preferred embodiment, fingers 27 are spaced apart at a distance equal to the spacing between adjacent magnetic poles on magnetic ring 21 and positioned on the inside of strip 21. By using the flux concentrator 25, the magnetic field of ring 21 is distorted in such a way as to increase the usable component of the field which passes through Hall effect device 23 positioned on the middle finger 27. The arrangement shown in FIGS. 1-3 thus concentrates the magnetic field such that a substantial level of flux is delivered in a normal direction to the Hall effect device 23.

Referring to FIG. 4, the speed control network 40 will be explained. Hall effect device 23 senses the rotation of turntable 3 through the variations in magnetic field strength passing through it. The output of Hall effect device 23 is applied to one input of phase detector 42. The other input to phase detector 42 is a reference frequency signal which is provided by reference oscillator 44. The Hall effect device provides an output signal comprising a series of pulses having a pulse rate related to the speed of rotation and the oscillator provides an output signal comprising a series of pulses having a frequency related to the desired rotational speed. The output of the phase detector is an error signal reflecting the difference in frequency between the signal from the sensing device 23 and oscillator 44. The error signal is applied via a low pass filter 46 to a power amplifier 48 which supplies the driving current to DC motor 9. If the error signal supplied by phase detector 42 increases, indicating motor over speed, less current is applied via amplifier 48 thus causing motor 9 to slow down. Conversely, if the speed error signal decreases, more power is coupled to motor 9 to compensate and cause the motor to speed up.

What is claimed is:

1. A turntable drive system comprising:
    a turntable for rotating a disc-shaped record
    a DC motor for rotating said turntable;
    a drive belt coupling said DC motor to said turntable;
    means for controlling the rotational speed of said turntable comprising:
    an annular member coaxially mounted on said turntable having a plurality of permanently magnetized poles of alternate polarity along the periphery thereof;
    a Hall effect device for sensing the rotary motion of said annular member and providing a signal indication of the rotational speed of said turntable;
    a motor mounting bracket providing a support for said Hall effect device and concentrating the magnetic flux from said annular member such that a component of the magnetic field from said annular member passes through the active area of said Hall effect device; and
    means responsive to said speed indication signal for controlling the level of drive to said DC motor;
    wherein said magnetized poles of alternate polarity along the periphery of said annular member are evenly spaced therearound and wherein said supporting means includes a plurality of projections, positioned adjacent said annular member, being spaced at a distance equal to the spacing between adjacent poles on said annular member, said projections concentrating said magnetic flux; and
    wherein said plurality of projections is equal to three and wherein said Hall effect device is positioned on one of said three projections.

2. The system according to claim 1 wherein said motor mounting bracket is formed of a ferromagnetic material.

3. The system according to claim 2 wherein said control means comprises a speed control servo loop including:
    a phase detector providing an error signal representative of the difference between a pulse rate repesentative of the turntable rotational speed which is provided by said Hall effect device and a fixed reference pulse rate; and means for supplying said error signal to said DC motor.

4. A turntable drive system comprising:

a turntable;

magnetic means, coupled to said turntable, for providing a magnetic field on a peripheral portion of said turntable;

rotary means for rotating said turntable;

a Hall effect device for sensing said magnetic field of said magnetic means; and a mounting bracket assembly, for supporting said rotary means, including, integrally formed therewith, a magnetic flux concentrating portion on which said Hall effect device is mounted;

wherein said flux concentrating portion of said mounting bracket is positioned in close proximity to said magnetic means such that the magnetic field from said magnetic means is distorted to concentrate a component of said magnetic field such that said component passes through an active portion of said Hall effect device to sense the rotary speed of said turntable.

* * * * *